United States Patent
Ferrari et al.

(10) Patent No.: US 6,634,839 B2
(45) Date of Patent: Oct. 21, 2003

(54) MACHINE TOOL

(75) Inventors: Maurizio Ferrari, Pizzighettone (IT); Carlo Massari, San Giorgio (IT)

(73) Assignee: Jobs S.p.A., Piacenza (IT)

( * ) Notice: Subject to any disclaimer, the term of this patent is extended or adjusted under 35 U.S.C. 154(b) by 18 days.

(21) Appl. No.: 09/946,339

(22) Filed: Sep. 6, 2001

(65) Prior Publication Data

US 2002/0026860 A1 Mar. 7, 2002

(51) Int. Cl.[7] .................................................. B23C 1/06
(52) U.S. Cl. ........................ 409/235; 408/234; 409/191; 409/202
(58) Field of Search ...................... 82/137, 135; 408/62, 408/234, 235; 384/44, 43, 42; 409/185, 190, 191, 202, 235

(56) References Cited

U.S. PATENT DOCUMENTS

| | | | |
|---|---|---|---|
| 3,859,003 A | * | 1/1975 | Schulz et al. ............... 408/234 |
| 3,988,965 A | | 11/1976 | Cayen et al. |
| 4,229,866 A | * | 10/1980 | Berthier ...................... 29/26 A |
| 4,444,534 A | * | 4/1984 | Bergman ..................... 409/164 |
| 4,742,609 A | * | 5/1988 | Neumann ....................... 483/3 |
| 4,987,668 A | * | 1/1991 | Roesch ........................ 409/145 |
| 5,314,397 A | * | 5/1994 | Mills et al. ................... 483/30 |
| 5,346,345 A | * | 9/1994 | Jerzycke et al. ............ 408/234 |
| 5,368,425 A | * | 11/1994 | Mills et al. ................. 408/234 |
| 5,662,568 A | * | 9/1997 | Lindem ....................... 483/30 |
| 5,933,933 A | * | 8/1999 | Fritz et al. .................. 29/33 P |
| 5,938,577 A | * | 8/1999 | Lindem ...................... 408/234 |
| 6,066,078 A | | 5/2000 | Koelblin et al. |
| 6,068,431 A | * | 5/2000 | Line ............................ 144/2.1 |
| 6,203,256 B1 | * | 3/2001 | Liao ............................ 409/235 |

FOREIGN PATENT DOCUMENTS

| | | |
|---|---|---|
| EP | 0546273 | 6/1993 |
| EP | 0893196 | 1/1999 |
| JP | 61-103714 | 5/1986 |

\* cited by examiner

Primary Examiner—Daniel W. Howell
(74) Attorney, Agent, or Firm—Davidson Berquist Klima & Jackson, LLP

(57) ABSTRACT

In a machine tool of the type comprising a spindle mounting slide which is driven by a linear electric motor and which runs in a vertical direction in a slideway, the slide comprises two runners designed to engage with corresponding fixed sliding guides integral with the slideway, and two roller pads that slide on corresponding longitudinal sliding surfaces which are also integral with the slideway.

22 Claims, 5 Drawing Sheets

MACHINE TOOL

BACKGROUND OF THE INVENTION

The present invention relates to a device for driving a spindle mounting slide.

The invention relates in particular to a device for driving the spindle mounting slide in a machine tool supported by a frame and controlled by linear motors that drive the tool at high speed along one or more axes.

In modern automatic machine tools, the tool is usually mounted on a supporting element driven by linear motors along three axes which are perpendicular to each other.

Automatic machine tools known in prior art comprise a linear electric motor which provides at least the vertical drive for the spindle mounting slide. The linear electric motor comprises a rotor, also known as primary member or simply "primary" and a stator, also known as secondary member or simply "secondary", the primary being integral with the spindle mounting slide, and the secondary being integral with the vertical slideway in which the slide runs.

The vertical slideway has, symmetrically positioned at the bottom of it, two pairs of fixed linear guides, for example of the recirculating ball type, which are permanently engaged with two corresponding longitudinal runners made on the mobile slide. The fixed guides also keep the primary and the secondary at a fixed distance from each other, this distance constituting the air gap of the linear motor.

The fixed guides are positioned on the vertical slideway at a suitable axial distance from each other to form on the slideway itself a particularly rigid zone that is capable of easily resisting the backlash transmitted by the spindle to the slide during machining.

The longitudinal extension of the slide is greater than the axial distance between the two pairs of fixed guides and the distance between the two pairs of guides is approximately equal to the vertical travel of the mobile slide. Indeed, lengthening the longitudinal extension of the fixed guides would unduly encumber the machine tool, with negative repercussions on the accuracy and performance of the machine.

Adding more pairs of fixed guides, although it does not considerably increase the weight of the slideway, nevertheless makes it necessary to lengthen the longitudinal runners in order to make the coupling between runner and guide permanent. If the coupling were not permanent, there would be a serious risk of dangerous collisions with the ends of the runners when they enter the guides on account of the high speed at which the spindle mounting slide moves.

For obvious practical purposes, the primary of the linear motor, which is mounted close to the upper part of the mobile slide, occupies a longitudinal portion of the slide itself so that it permanently faces the secondary which is fixed to the vertical slideway.

When the spindle mounting slide is driven to its uppermost position, the part of the slide with the primary on it projects with respect to the support offered to it by the fixed sliding guides and, consequently, the considerable magnetic force between the primary and the secondary attracts the primary and the secondary to each other. This tends to bend the slide and to move it out of alignment relative to its fixed support, with negative repercussions on machining precision.

The aim of the present invention is to overcome the above mentioned disadvantage by providing a device that is used to drive the spindle mounting slide and that is light, compact and economical to construct.

SUMMARY OF THE INVENTION

The present invention accordingly provides a machine tool comprising at least one spindle mounting slide extending mainly longitudinally along a defined axis and able to move in a direction parallel to said axis at least between a first retracted end position and a second extended end position relative to a fixed slideway extending in said direction, driven by at least one linear electric motor, a primary member of which is connected to the slide and a secondary member of which is connected to the slideway, said slideway comprising fixed sliding guides which are integral with the slideway itself, extend longitudinally in said direction for a distance shorter than the longitudinal extension of the secondary member and engage with runners that are integral with the slide, a longitudinal portion of the spindle mounting slide comprising at least one portion of the primary member which projects with respect to the fixed sliding guides at at least one of the two end positions of the slide itself, wherein the slide comprises sliding contact means that oppose the slideway at least when the portion of the primary member is in the position where it projects with respect to the fixed sliding means and the magnetic force is attracting the primary member and the secondary member of the linear electric motor to each other.

BRIEF DESCRIPTION OF THE DRAWINGS

The invention will now be described with reference to the accompanying drawings which illustrate a preferred embodiment of it and in which.

DESCRIPTION OF THE PREFERRED EMBODIMENTS

Figure 1:
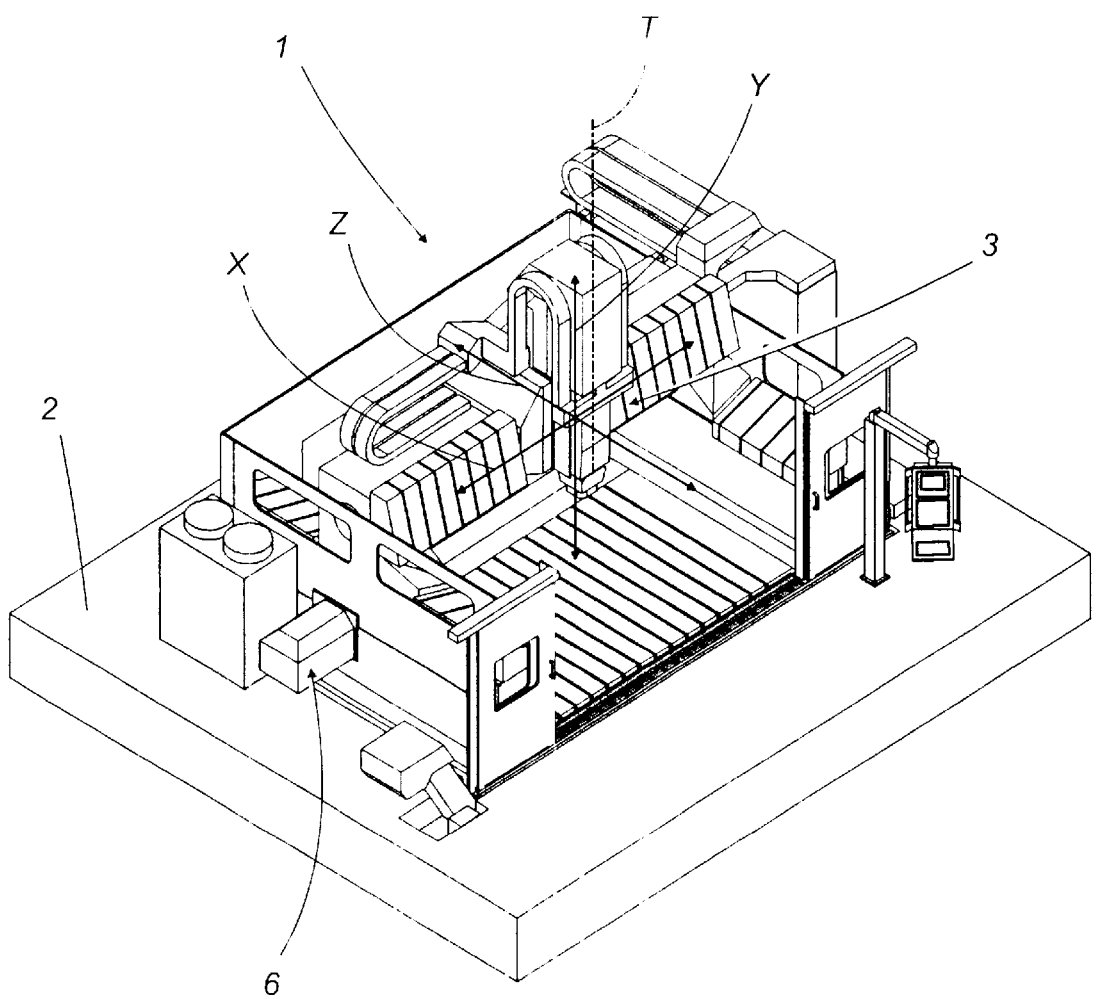
FIG. 1 is a schematic perspective view of a machine tool made in accordance with the present invention.

With reference to FIG. 1, the numeral 1 denotes in its entirety an automatic machine tool of the numeric control type mounted on a base 2. The machine 1 is equipped with an operating module 3 that can move in three-dimensional space along the three linear axes X, Y and Z of a Cartesian system.

The operating module 3 comprises a slide 4 that mounts a spindle 5 which transmits rotational cutting motion to a customary cutting tool that is not illustrated. The slide 4 extends mainly along a longitudinal axis T and can move in a vertical direction V parallel to the aforementioned Y axis between a first retracted end position, illustrated in FIG. 2, and a second extended end position, illustrated in FIG. 3.

The machine 1 illustrated in FIG. 1 is also equipped with a customary magazine, which is not illustrated in detail and is schematically labeled 6. This magazine houses a plurality of tools which the operating module 3 can access at any time during a machining cycle to automatically change tool whenever a different tool is required for a different machining operation.

Figure 2:
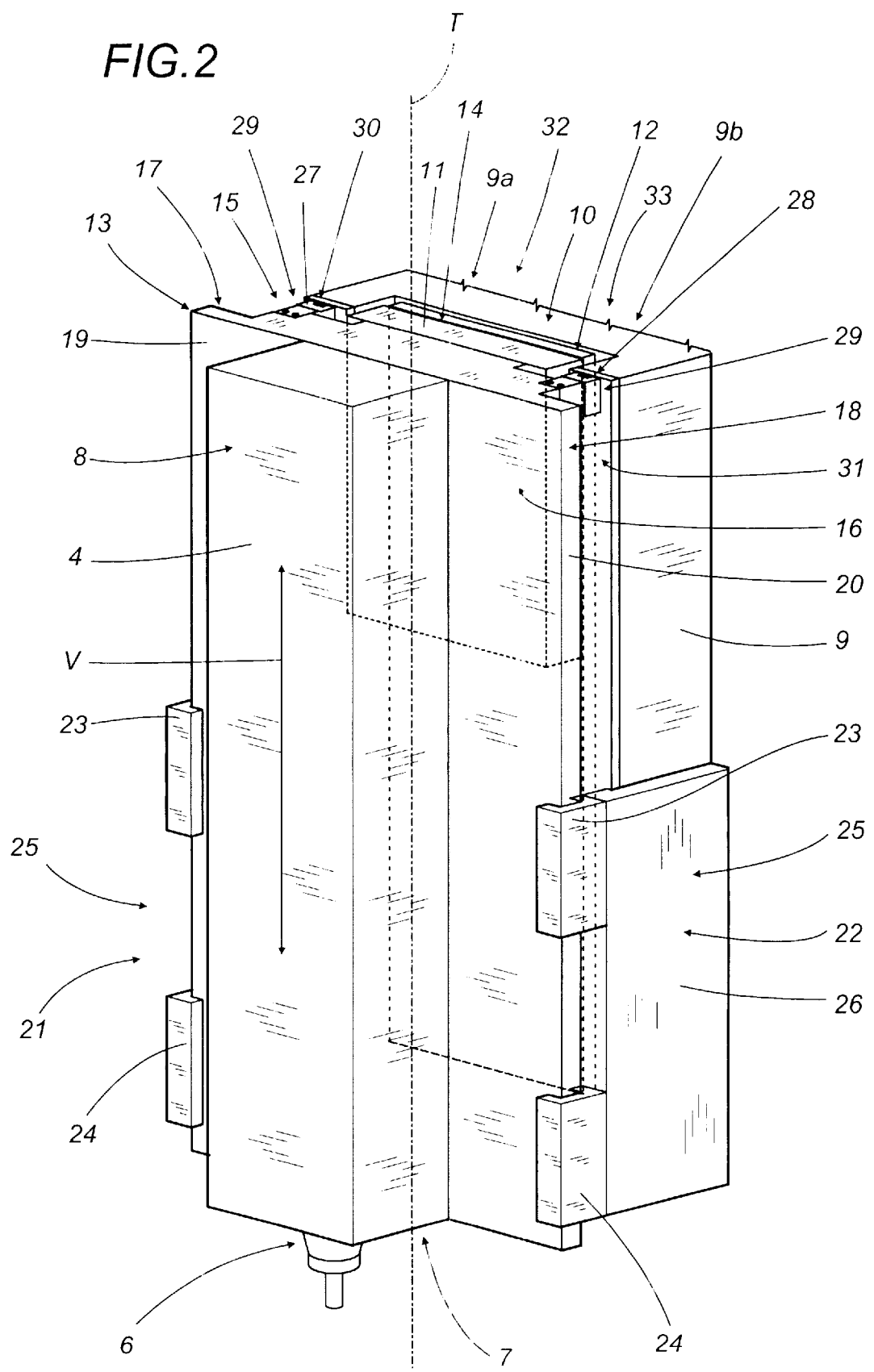
FIG. 2 is a schematic perspective detail view of a part of the machine tool shown in FIG. 1, and illustrates the part in a first, retracted operating position.
Figure 3:
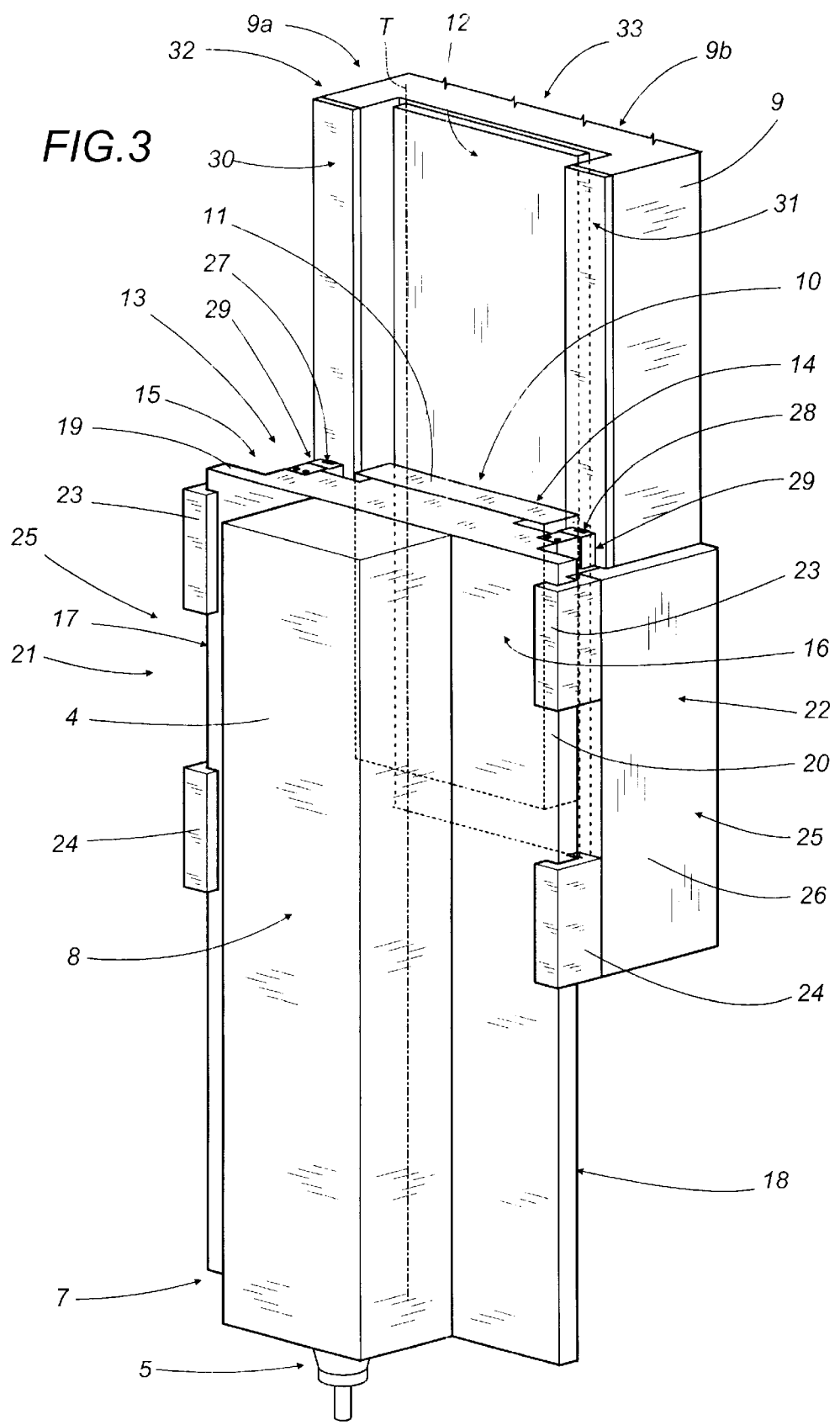
FIG. 3 is a schematic perspective detail view of the part shown in FIG. 2, and illustrates the part in a second, extended operating position.

As shown in FIGS. 2 and 3, the lower end 7 of the slide 4 mounts the spindle 5 to which the aforementioned tools (not illustrated) are fitted, and presents a parallelepiped shaped protrusion 8, extending longitudinally and housing the equipment used to drive the spindle 5 and which is of customary type and therefore not illustrated.

The slide 4 is supported and guided in its vertical movement by a slideway 9 that is mounted in fixed position relative to the vertical direction V and also extending longitudinally along the direction V itself.

The slide 4 is driven by a linear electric motor 10 comprising a primary member or rotor 11 and a secondary member or stator 12.

Again with reference to FIGS. 2 and 3, the primary member or rotor 11 is mounted on and connected to the slide 4 at an upper end 13 of it, opposite the aforementioned lower end.

The secondary member or stator 12 extends longitudinally along the full length of the slideway 9 and is integral with the slideway.

The primary member 11 and the secondary member 12 are positioned opposite each other and separated by a suitable air gap 14 according to the known operating principle of linear electric motors.

At its edges 15, 16, symmetrically opposite each other relative to the axis T, the slide 4 has two thin longitudinal portions 17, 18 constituting two runners 19, 20 each designed to engage with a corresponding pair 21, 22 of fixed sliding guides 23, 24, respectively upper and lower, which are integral with the slideway 9 at two corresponding edges 9a, 9b to form a sliding fit between the slide 4 and the slideway 9.

Figure 4:
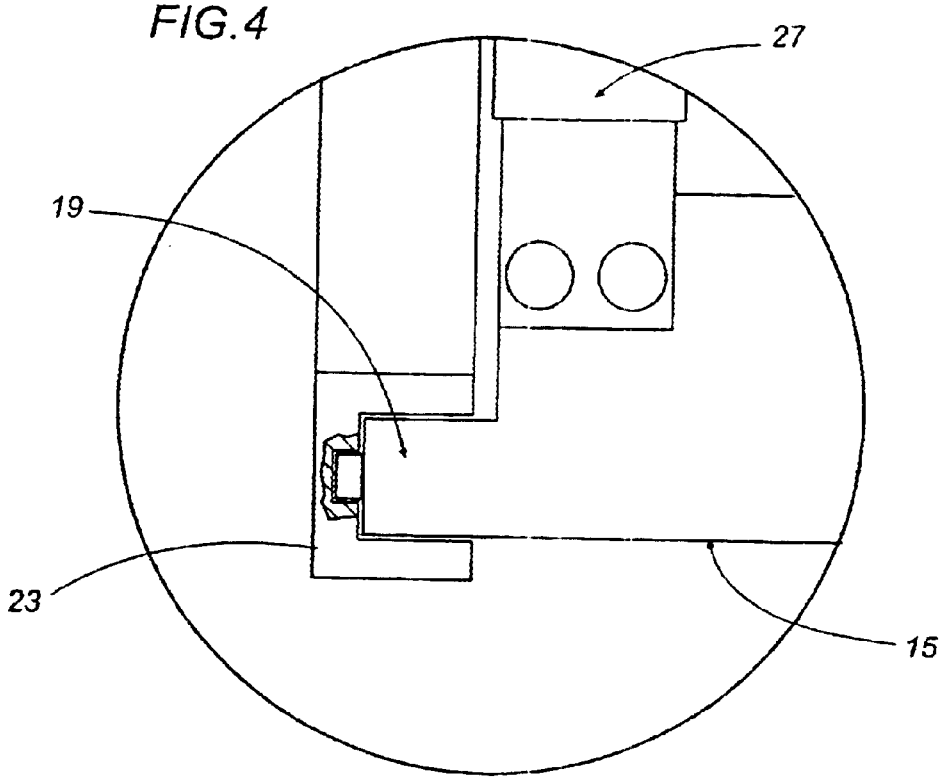
FIG. 4 is an enlarged top plan view, partially sectioned, of a first portion of the part of the machine tool shown in FIGS. 2 and 3.
Figure 5:
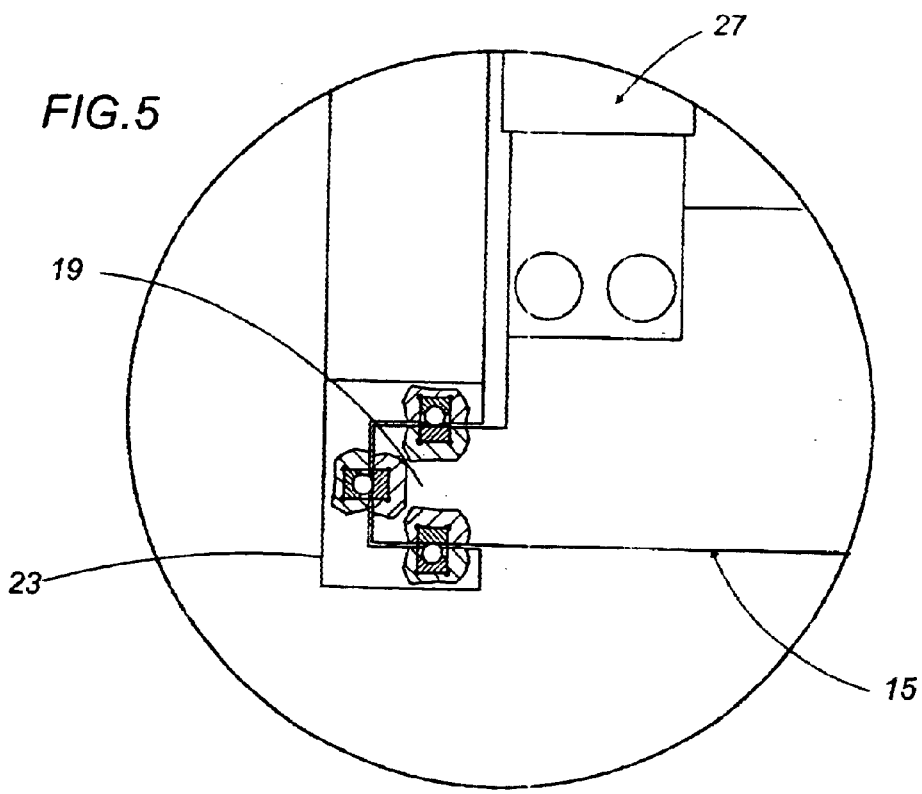
FIG. 5 shows an alternative embodiment of the first portion of FIG. 4.
Figure 6:
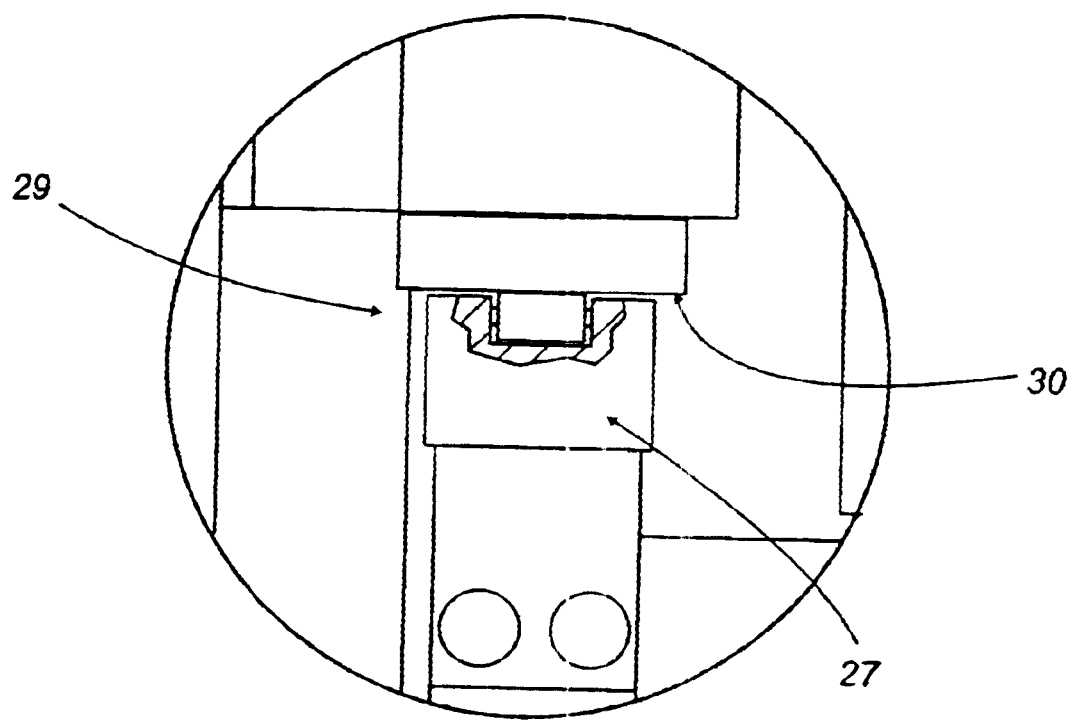
FIG. 6 is an enlarged top plan view, partially sectioned, of a second portion of the part of the machine tool shown in FIGS. 2 and 3.

The guides 23, 24 of each pair 21, 22 constitute fixed sliding means denoted in their entirety by the numeral 25. Advantageously, these guides 23, 24 are of the recirculating ball type (FIG. 5) or roller type (FIG. 4).

With reference to FIGS. 2 and 3, the two, upper and lower guides 23, 24 of each pair 21, 22 delimit a lower portion 26 of the slideway 9, this portion having a larger cross section than the rest of the slideway so as to confer maximum rigidity on the operating module 3 during machining.

With reference to FIGS. 2 and 3, the upper end 13 of the slide 4 presents two pads 27, 28 positioned symmetrically opposite each other relative to the axis T and together constituting sliding contact means 29 for the slide 4 as it moves relative to the slideway 9. In the preferred embodiment illustrated in the drawings, the pads 27 and 28 are of the type with rollers that run on corresponding longitudinal sliding surfaces 30, 31 which are integral with the slideway 9 and are located symmetrically opposite each other relative to the axis T at corresponding lateral zones 32, 33 of the slideway 9 itself.

During operation of the machine 1, the spindle mounting slide 4 moves rapidly in direction V towards and away from the workpiece.

As shown in FIG. 2, when the slide 4 reaches the upper position, which is retracted relative to the vertically fixed slideway 9, the primary 11 faces the secondary 12 in a configuration in which the upper end 13 of the slide 4 is not supported by the fixed guides 23, 24.

As shown in FIG. 3, instead, when the slide 4 reaches the extended position relative to the slideway 9, the primary 11 faces the secondary 12 in a zone forming part of the longitudinal portion delimited by the guides 23, 24 and which is therefore especially rigid. In the retracted configuration of FIG. 2, the pads 27, 28 keep the air gap 14 at a constant value by preventing the primary member 11 and the secondary member 12 from moving closer to each other on account of the strong magnetic force created by the flow of current.

What is claimed:

1. A machine tool of the type comprising:
    at least one spindle mounting slide extending mainly longitudinally along a defined axis and able to move in a direction parallel to said axis, the spindle mounting slide presenting a lower end on which a spindle is mounted and an upper end opposite to said lower end;
    a fixed slideway extending in said direction and comprising a lower portion having fixed sliding means which are integral with the slideway itself, engaging with runners which are integral with the spindle mounting slide; at least one linear electric motor, a primary member of which is connected to the slide and a secondary member of which is connected to the slideway; the lower portion extending longitudinally in said direction for a distance shorter than the longitudinal extension of the secondary member;
    the spindle mounting slide being movable, relative to the fixed slideway, at least between a first retracted end position, in which the upper end of the spindle mounting slide, having at least one portion of the primary member, projects from the fixed sliding means, faces the secondary member and it is not supported by said fixed sliding means, and a second extended end position, in which the upper end of the spindle mounting slide, having said at least one portion of the primary member, is supported by the fixed sliding means;
    wherein the slide further comprises sliding contact means that oppose the slideway at least when said upper end projects from the fixed sliding means facing the secondary member and the magnetic force is attracting the primary member and the secondary member of the linear electric motor to each other.

2. The machine tool according to claim 1, wherein the fixed sliding means comprise at least two guides located on the slideway on opposite sides of the longitudinal axis of the slide.

3. The machine tool according to claim 1, wherein the fixed sliding means comprise at least two pair of guides located on the slideway on opposite sides of the longitudinal axis of the slide.

4. The machine tool according to claim 2, wherein the guides are of the recirculating ball type.

5. The machine tool according to claim 2, wherein the guides are of the roller type.

6. The machine tool according to claim 1, wherein the sliding contact means comprise at least one pad that is integral with the slide and designed to engage with at least one corresponding sliding surface that is integral with the slideway.

7. The machine tool according to claim 6, wherein the pad is of the roller type.

8. The machine tool according to claim 3, wherein the guides are of the recirculating ball type.

9. The machine tool according to claim 3, wherein the guides are of the roller type.

10. The machine tool according to claim 2, wherein the sliding contact means comprise at least one pad that is integral with the slide and designed to engage with at least one corresponding sliding surface that is integral with the slideway.

11. The machine tool according to claim 10, wherein the pad is of the roller type.

12. The machine tool according to claim 3, wherein the sliding contact means comprise at least one pad that is integral with the slide and designed to engage with at least one corresponding sliding surface that is integral with the slideway.

13. The machine tool according to claim 12, wherein the pad is of the roller type.

14. The machine tool according to claim 4, wherein the sliding contact means comprise at least one pad that is integral with the slide and designed to engage with at least one corresponding sliding surface that is integral with the slideway.

15. The machine tool according to claim 14, wherein the pad is of the roller type.

16. The machine tool according to claim 5, wherein the sliding contact means comprise at least one pad that is integral with the slide and designed to engage with at least one corresponding sliding surface that is integral with the slideway.

17. The machine tool according to claim 16, wherein the pad is of the roller type.

18. The machine tool according to claim 8, wherein the sliding contact means comprise at least one pad that is integral with the slide and designed to engage with at least one corresponding sliding surface that is integral with the slideway.

19. The machine tool according to claim 18, wherein the pad is of the roller type.

20. The machine tool according to claim 9, wherein the sliding contact means comprise at least one pad that is integral with the slide and designed to engage with at least one corresponding sliding surface that is integral with the slideway.

21. The machine tool according to claim 1, wherein the primary member of the motor is mounted at the upper end of the spindle mounting slide.

22. The machine tool according to claim 6, wherein the sliding contact means comprise two pads positioned symmetrically opposite each other relative to the longitudinal axis of the slide.

* * * * *